W. E. SPARKS,

Assignor to P. & F. CORBIN.

Closet-Latch.

No. 8,645. Reissued April 1, 1879.

Witnesses.

W. B. Thomson.

P. J. Markley

Inventor.

William E. Sparks.

By James Shepard Atty.

N. PETERS, PHOTO-LITHOGRAPHER, WASHINGTON, D. C.

UNITED STATES PATENT OFFICE.

WILLIAM E. SPARKS, OF NEW BRITAIN, CONNECTICUT, ASSIGNOR TO P. & F. CORBIN.

IMPROVEMENT IN CLOSET-LATCHES.

Specification forming part of Letters Patent No. 172,191, dated January 11, 1876; Reissue No. 8,645, dated April 1, 1879; application filed October 21, 1878.

*To all whom it may concern:*

Be it known that I, WILLIAM E. SPARKS, formerly of New Haven, now of New Britain, in the county of Hartford and State of Connecticut, have invented an Improved Closet-Catch, of which the following is a specification:

This catch is provided with a sliding latch having a knob upon the back part and a stud projecting through a mortise in the plate. A spring behind the plate enters a notch in the stud, and serves to project the latch, and also to hold the back end thereof, so that it will not fall away from the plate.

This latch is very cheap to construct, as well as being durable and efficient, and the plate and latch are so made that they can be cast, and will require little or no hand-labor, and the spring prevents them from separating when in use.

Figure 1:
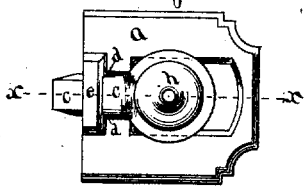
Figure 3:
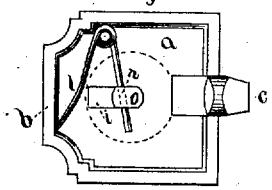
Figure 2:
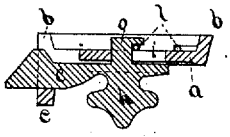
Figure 4:
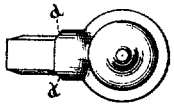

In the drawings, Figure 1 is a front elevation; Fig. 2, a sectional view on the line *x x* of Fig. 1. Fig. 3 is a rear view of the said spring closet-catch, and Fig. 4 is a front elevation of the latch of said catch.

The plate *a* is made with a rim, *b*, at the back, which does not extend across the end of the plate from which the latch *c* protrudes, that end being left open back of the bridge *e*, behind which the latch slides, to facilitate molding said plate for casting. There is a mortise or slot, *i*, in this plate for the stud *o* at the back of the latch *c* to slide in, which stud constitutes a part of the latch. The side walls of this slot serve as open guides, between which the stud plays longitudinally, the sides of the stud on the latch acting as side bearings on the latch to govern its inner end. This same shoulder or side of the stud *o* also serves as a spring-seat. This side of the stud is also provided with a projection, *n*, standing at right angles thereto, which serves to retain the spring in place.

The beveled end of the latch is adapted for working under or back of the bridge *e*, and also to be inserted in place from the inside of said bridge. Shoulders *d d* are formed on the sides of the latch just back of the beveled end, which, when the parts are in place, will engage the bridge *e*, and act as stops to limit the outward throw of the bolt. The knob or thumb-piece *h*, of suitable shape, is rigidly formed on the latch.

After these two parts, the latch and the plate, have been separately formed, they are put together by entering the beveled or outer end of the latch beneath the bridge from the inside thereof, and passing the stud *o* of the latch from the front side of the plate backward between the open guides of the plate. The spring *l* is then put in place with one arm engaging the stud *o*, and between the plate *a* and the projection *n*, whereby the spring is held in place, and not only performs the usual office of projecting the bolt, but also serves to retain the parts in place because the latch and its stud cannot be pulled forward from the plate without first removing the spring.

Suitable screw-holes are provided for attaching the closet-catch, and a strike or keeper of the usual kind is provided for the end of the catch to engage.

I disclaim all catches in which the latch is slipped longitudinally into place, and prevented from slipping out of place by means of the knob secured thereto subsequent to the insertion of the latch.

I claim as my invention—

1. In a closet-catch, the plate having a bridge at one end adapted to receive and guide the beveled end of the latch, and having at the other end open guides for the side bearings, which form an integral part of the latch-bolt, said plate being adapted to receive the bolt in its working position when presented thereto from the outside of said plate, substantially as described, and for the purposes specified.

2. In a closet-catch, the body of the latch-bolt and the knob *h*, rigidly attached together independent of the other parts, and adapted to be put in place in a proper frame or plate when so attached, substantially as described, and for the purpose specified.

3. The plate having a bridge at one end and open guides at the other, in combination with the latch-bolt having side bearings integral therewith, working in said open guides, and the rigid knob, the whole adapted for putting the latch in place on the plate, while the knob and latch are rigidly secured together, substantially as described, and for the purpose specified.

4. The combination of the plate having a bridge at one end and open guides at the other, the latch having side bearings integral therewith, working in said open guides and the spring-retaining shoulder, the spring coacting therewith to hold the latch in place independent of the knob or handle of the latch, and also to project the latch from the plate, substantially as described, and for the purpose specified.

WILLIAM E. SPARKS.

Witnesses:
CHARLES PECK,
E. L. PRIOR.